United States Patent [19]
Spitale et al.

[11] Patent Number: 5,211,068
[45] Date of Patent: May 18, 1993

[54] ONE-WAY SYNCHRONIZER

[75] Inventors: Ralph J. Spitale, West Bloomfield; Lance M. Tobey, Livonia, both of Mich.

[73] Assignee: Borg-Warner Automotive Inc., Sterling Heights, Mich.

[21] Appl. No.: 927,442

[22] Filed: Aug. 10, 1992

[51] Int. Cl.$^5$ .............................. F16H 3/38
[52] U.S. Cl. ......................... 74/339; 192/53 F
[58] Field of Search ........... 192/53 R, 53 F; 74/339

[56] References Cited

U.S. PATENT DOCUMENTS

| | | | |
|---|---|---|---|
| 4,360,094 | 11/1982 | Ikemoto et al. | 192/53 F |
| 4,598,599 | 7/1986 | Ikemoto | 192/53 F X |
| 4,674,346 | 6/1987 | Hiraiwa | 74/339 |
| 4,782,929 | 11/1988 | Muller | 192/53 |
| 4,889,003 | 12/1989 | Rietsch | 192/53 F |
| 5,083,993 | 1/1992 | Önn | 192/53 F |

OTHER PUBLICATIONS

Socin & Walters Manual Transmission Synchronizers SAE Paper No. 68008 published Jan., 1968.

Primary Examiner—Dirk Wright
Attorney, Agent, or Firm—Reising, Ethington et al.

[57] ABSTRACT

A gear transmission has a one-way synchronizer comprising a guide hub that is an integral part of a geared input member, and a shift sleeve that slides axially on the guide hub from a central neutral position either to an extended engaged position or to a retracted disengaged position.

12 Claims, 3 Drawing Sheets

ONE-WAY SYNCHRONIZER

BACKGROUND OF THE INVENTION

This invention relates generally to synchronizers for gear transmissions and more particularly to one-way strut type blocking synchronizers.

Strut type blocking synchronizers are well known. See for instance SAE paper 68008 entitled Manual Transmission Synchronizers authored by Richard J. Socin and L. Kirk Walters.

These well known synchronizers employ a plurality of circumferentially spaced struts that key a blocker ring to a guide hub and provide the initial load for indexing the blocker ring so that a shift sleeve can apply pressure to engage a cone clutch. The struts are slidably mounted on the guide hub and operatively connected to the shift sleeve (that ultimately accomplishes the gear lock-up) by spring biased detents that release when forces applied to the struts reach a predetermined limit.

Synchronizers are often used as two-way synchronizers that are located between two unlocked gears on a power shaft. The synchronizer then locks up one gear when the shift sleeve is shifted in one direction and the other gear when the shift sleeve is shifted in the opposite direction. In such situations, the struts for the synchronizer are trapped between separate blocker rings for each of the unlocked gears as shown in FIG. 4 of the SAE publication that is referenced above. Consequently, two way synchronizers do not need any retainers or other structure to limit travel of the struts.

Synchronizers are also used as one-way synchronizers that have only one blocker ring which means that the struts are not trapped. Thus there is a need to limit the travel of the struts in one-way synchronizers in one direction. In the past one-way synchronizers have added either snap rings or sheet metal retainers and snap rings to provide the necessary travel limit in the direction away from the blocker ring.

Both retention methods, however, are relatively expensive. Each involve the manufacture, handling and assembly of an extra part or parts, such as the snap ring alone or in combination with the sheet metal retainer. Each method also involves extra manufacturing steps for securing these extra parts to existing parts, such as machining grooves in the guide hub to hold the sheet metal retainer and/or the snap ring.

SUMMARY OF THE INVENTION

The object of this invention is to provide an improved strut type blocking synchronizer having improved struts that self limit travel in one direction so that the improved synchronizer can be used as a one-way synchronizer without any need for extra parts or auxiliary hardware to retain the struts.

A feature of the invention is that the improved strut type blocking synchronizer is more economical to manufacture than the known one-way synchronizers described above.

Another feature of the invention is that the improved strut type blocking synchronizer is a very compact design.

Yet another feature of the invention is that the improved strut type blocking synchronizer has struts that incorporate self limiting structure at little or no cost.

Still another feature of the invention is that the improved strut type blocking synchronizer uses self limiting struts of simple design.

An advantage of the improved strut type blocking synchronizer of the invention is that the guide hub can be integrated into a one-piece structure with a gear.

Another advantage of the improved strut type blocking synchronizer of the invention is that the synchronizer may be used in applications that require long travel distances for the shift sleeve such as applications where one synchronizer must be disengaged when another synchronizer is engaged.

BRIEF DESCRIPTION OF THE DRAWINGS

The above and other objects, features and advantages of the invention will become more apparent from the following description taken in conjunction with the accompanying drawings wherein like references refer to like parts and wherein.

DESCRIPTION OF THE INVENTION

Figure 1:
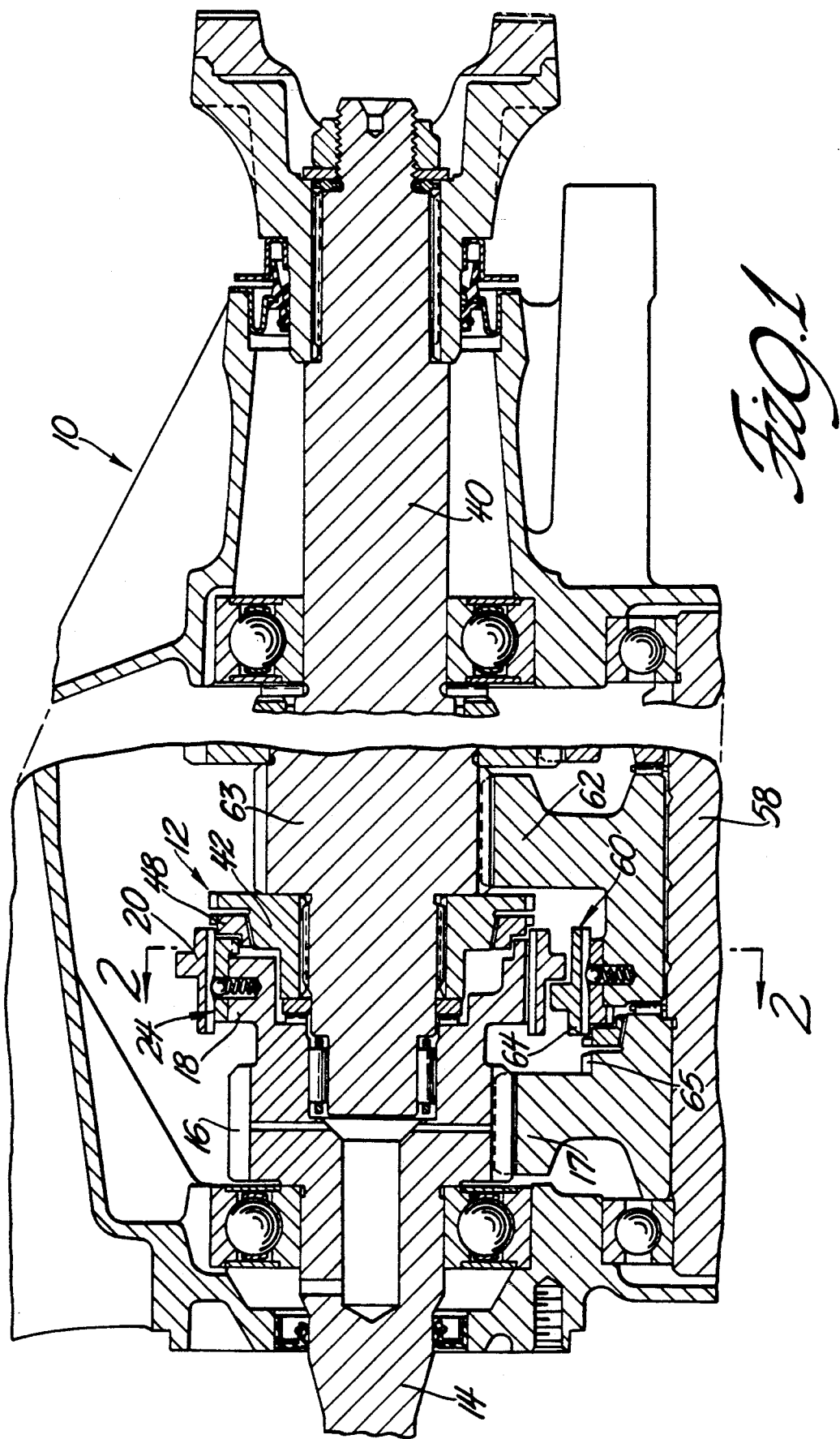
FIG. 1 is an axial cross section of a gear transmission equipped with a one-way synchronizer in accordance with the invention.
Figure 2:
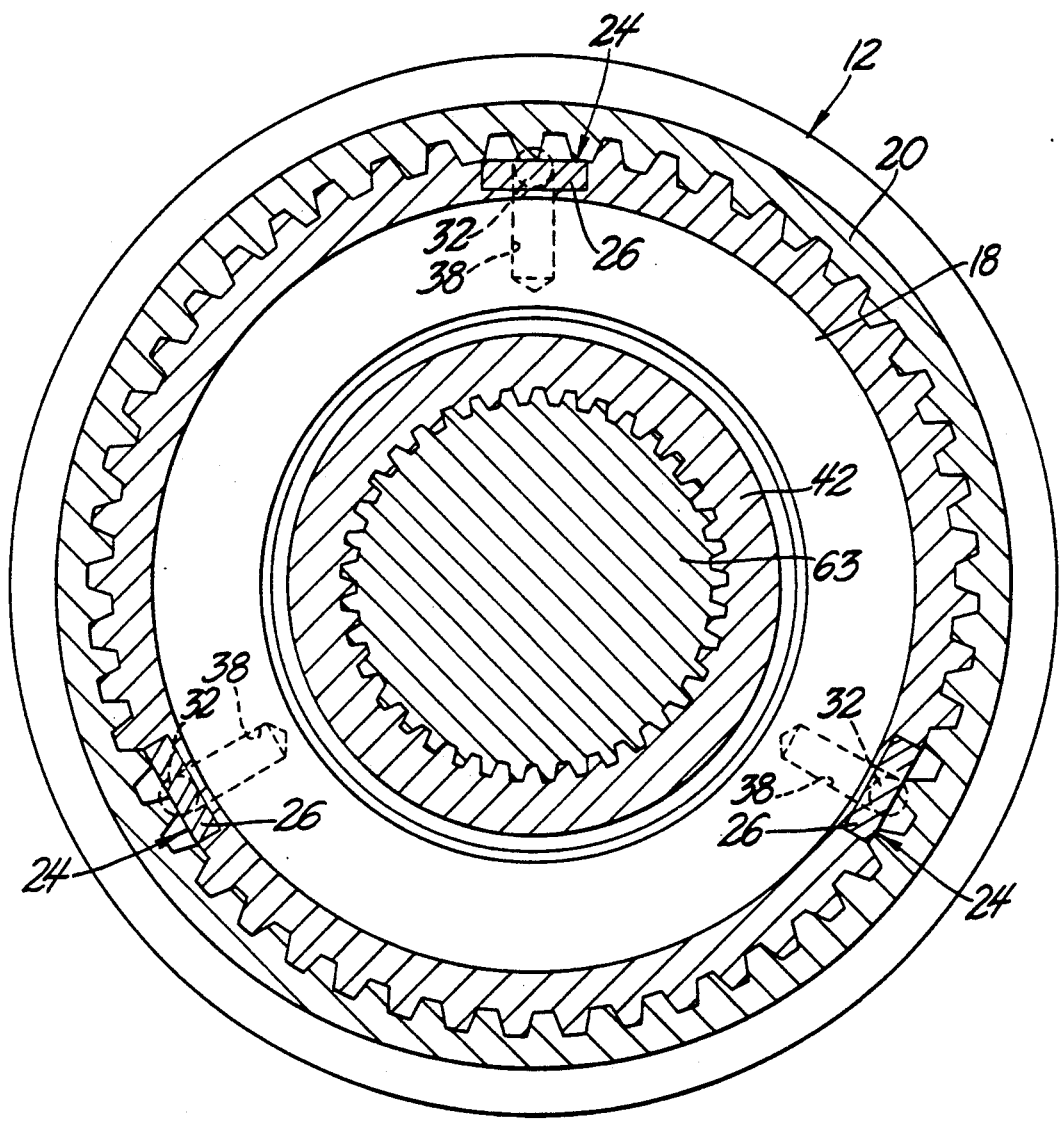
FIG. 2 is a section taken substantially along the line 2—2 of FIG. 1 looking in the direction of the arrows.

Referring now to the drawing, the gear transmission 10 is equipped with a one-way synchronizer of this invention indicated generally at 12. The synchronizer 12 is associated with an input shaft 14 that has a gear 16 and a guide hub 18 that are formed as integral parts of the shaft 14. The guide hub 18 is spaced axially from the gear 16 and it is part of the synchronizer 12.

The synchronizer further comprises a shift sleeve 20 that has internal splines 22 engaging external splines 23 of the guide hub 18 so that the shift sleeve 20 travels or slides axially on the guide hub 18 and a collar 21 for shifting the sleeve 20 with a shift fork or other mechanical operator (not shown). The shift sleeve 20 has a central neutral or disengaged position N on the guide hub 18 that is shown in solid lines in FIGS. 1 and 3. From this neutral position N, the shift sleeve 20 slides axially on the guide hub 18 in opposite directions either to an extended engaged position E further away from the gear 16 or to a retracted disengaged position R closer to the gear 16. The extended engaged position E and the retracted disengaged position R are indicated in dashed lines in FIG. 3. Position E is shown in solid lines in FIG. 4.

The synchronizer 12 has three circumferentially spaced struts 24 that are disposed between the guide hub 18 and the shift sleeve 20 in the radial direction. The struts 24 fit in slots of the guide hub that are formed by eliminating several of the external splines 23. The struts 24 slide axially with respect to the guide hub 18 and the shift sleeve 20 within limits as described below.

Each of the struts 24 comprise a bar shaped body 26 that has a round hole 28 extending through it and a depending tab 30 at one end. Each of the struts 24 is operatively connected to the shift sleeve 20 by a detent that comprises a ball 32 that has a sliding fit in the hole 28, a shallow cam pocket 34 in the inner surface of the shift sleeve 20, and a coil spring 36 in a blind ended bore or chamber 38 in the guide hub 18. The coil springs 36 engage the balls 32 and bias the balls 32 into engagement with the cam pockets 34 of the shift sleeve 20 when the shift sleeve 32 is in the neutral disengaged position N shown in solid lines in FIGS. 1 and 3. The three detents cause the struts 24 to follow the shift sleeve 20 when it slides axially with respect to the guide hub 18 until forces applied to the struts 24 exceed a predetermined limit that is a function of the force of springs 36, the ramp angles of the shallow cam pockets 34 and friction.

The gear transmission 10 has a coaxial output shaft 40 that has one end journalled in a hollow end of the input shaft 14 and a drive member 42 that is spline connected to it near the journalled end. The drive member 42 has an outer cone clutch surface 44 and a ring of clutch teeth 46 that are engaged by the splines 22 of the shift sleeve 20 when the shift sleeve 20 is in the extended engaged position E where the input shaft 14 and the output shaft 40 are locked up for direct drive.

The synchronizer 12 further comprises a blocker ring 48 that is disposed between the guide hub 18 and the ring of clutch teeth 46 of the drive member 42. The blocker ring 48 has an inner cone clutch surface 50 that is juxtaposed the cone clutch surface 48 of the drive member 42, cam clutch teeth 52 that cooperate with the splines 22 of the shift sleeve 20 as it translates from the central disengaged position N to the extended engaged position R, and axial drive slots 54 for indexing the blocker ring 48 circumferentially with respect to the drive member 42.

The depending tabs 30 of the struts 24 extend radially inwardly so that the depending tabs 30 are disposed in the axial drive slots 54 and act as drive lugs for indexing the blocker ring 48. The tabs 30 are narrower than the drive slots 54 so that the blocker ring 48 indexes circumferentially with respect to the guide hub 18 as well as the drive member 42 during the synchronizer engagement process in a well known manner. The extended engaged position of the shift sleeve 20 and the related parts is shown in FIG. 4.

Figure 3:
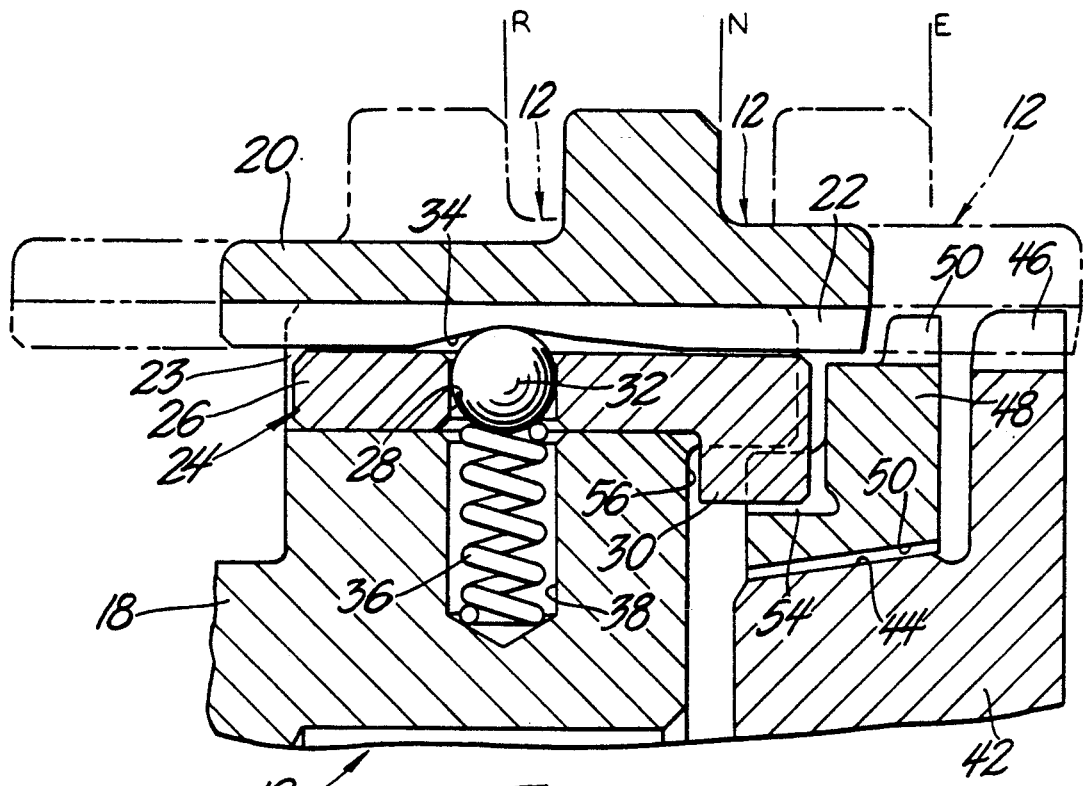
FIG. 3 is an enlargement of a portion of FIG. 1 showing the shift sleeve in a central neutral position.
Figure 4:
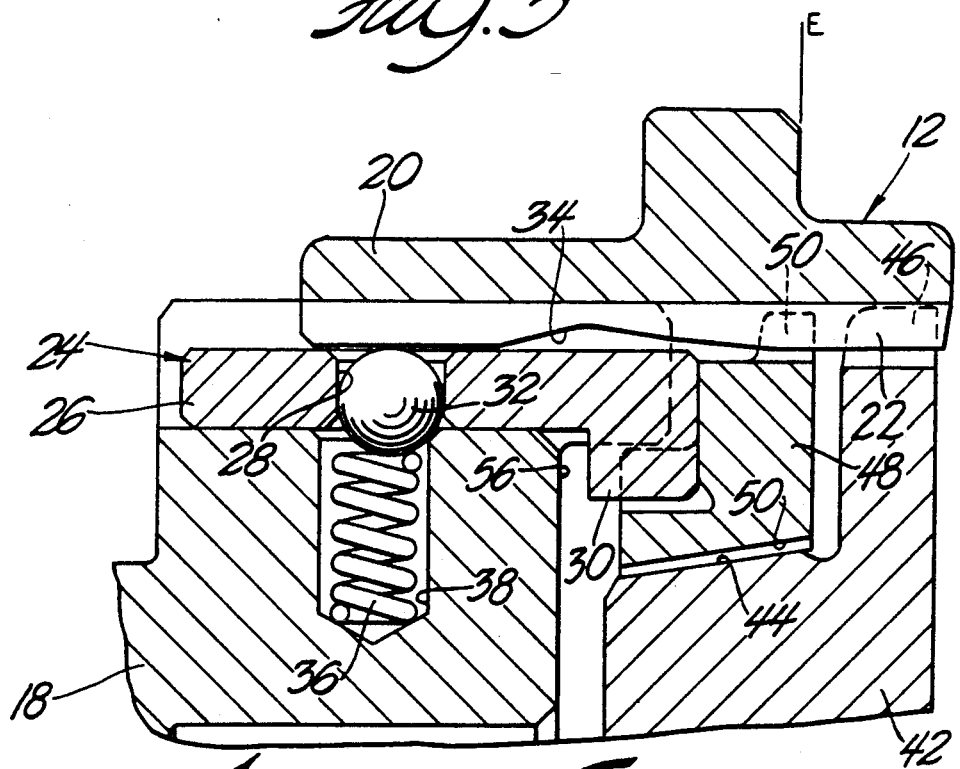
FIG. 4 is a view similar to FIG. 3 showing the shift sleeve in an extended engaged position.

When the shift sleeve 20 is disengaged, that is returned from the extended engaged position E shown in FIG. 4 to the central neutral or disengaged position N, shown in FIG. 3 the shift sleeve 20 picks up and also returns the struts 24 to their neutral position on its return stroke. The depending tabs 30 are positioned to engage an end face 56 of the input shaft 14 to limit axial translation of the struts with respect to the guide hub 18 in the direction toward the gear 16. Consequently the struts 24 cannot over travel when the shift sleeve 20 is retracted from the extended engaged position E back to the central neutral position N.

As indicated earlier, the shift sleeve 20 also translates to a retracted disengaged position R that is considerably closer to the gear 16. The depending tabs 30 also retain the struts 24 so that the struts 24 cannot follow the shift sleeve 22 when it slides from the central disengaged position N to the retracted disengaged position R. This feature is especially useful in situations where the operation of the one-way synchronizer 12 is coupled with the operation of another one-way synchronizer 60.

A typical situation is shown in FIG. 1 where the gear transmission 10 has a counter shaft 58 for driving the output shaft 40 at a different speed which in this case is accomplished by disengaging the direct drive synchronizer 12 and engaging synchronizer 60 to lock up unlocked gear 62 so that the output shaft 40 is driven by meshing gear sets 16, 17 and 62, 63.

In this regard, the synchronizer 60 is identical to the synchronizer 12 except that it operates in a counter manner. The synchronizer 60 has a shift sleeve 64 that has a central neutral position that coincides with the central neutral position of the shift sleeve 20 of the synchronizer 12 as shown in FIG. 1. The shift sleeve 14 synchronizer 60 has an extended engaged position that coincides with the retracted disengaged position of the shift sleeve of the synchronizer 12. In this coincidental position, which is to the left of that shown in FIG. 1, the splines of sleeve 64 engage clutch teeth 65 to lock up gear 62. The shift sleeve 64 also has a retracted disengaged position that coincides with the extended engaged position of the synchronizer 12 which is to the right of that shown in FIG. 1. In this coincidental position shift sleeve 64 is disengaged while shift sleeve 20 is engaged as indicated earlier. Consequently the one-way synchronizers 12 and 60 can be operated simultaneously by the same shift fork or other mechanical operator to shift the sleeves 20 and 64 either right or left together as viewed in FIG. 1. This engages one or the other of the synchronizers and insures that one is disengaged when the other is engaged.

The invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. A one-way synchronizer for a gear transmission comprising:
   a first drive member having a guide hub and a shift sleeve having splines engaging splines of the guide hub so that the shift sleeve slides axially on the guide hub,
   the shift sleeve having a disengaged position on the guide hub being slidable axially on the guide hub to an extended engaged position,
   a plurality of circumferentially spaced struts disposed between the guide hub and the shift sleeve so that the struts slide axially with respect to the guide hub and the shift sleeve,
   detents operatively connecting the struts to the shift sleeve when the shift sleeve is in the central disengaged position so that struts follow the shift sleeve when it slides axially with respect to the guide hub until forces applied to the struts exceed a predetermined limit,
   a second coaxial drive member having a cone clutch surface and a ring of clutch teeth that are engaged by the splines of the shift sleeve when the shift sleeve is in extended engaged position, and
   a blocker ring between the guide hub and the ring of clutch teeth of the second drive member, the blocker ring having a cone clutch surface juxtaposed the cone clutch surface of the second drive member, cam clutch teeth that cooperate with the splines of the shift sleeve as it translates from the central disengaged position to the extended engaged position, and axial drive slots for indexing the blocker ring circumferentially with respect to the second drive member, the struts having drive lugs that are disposed in the drive slots for indexing the blocker ring circumferentially with respect to the second drive member and stops that engage the first drive member to limit axial translation of the struts with respect to the guide hub when the shift sleeve is retracted from the extended engaged position.

2. The one-way synchronizer as defined in claim 1 wherein the struts have tabs at one end that extend radially inwardly to provide the stops and wherein the stops engage an end face of the first drive member.

3. The one-way synchronizer as defined in claim 2 wherein the tabs also provide the drive lugs for indexing the blocker ring circumferentially with respect to the second drive member.

4. The one-way synchronizer as defined in claim 3 wherein the detents comprise cam pockets of the shift sleeve, balls disposed in round holes of the struts, and springs disposed in chambers of the guide hub that engage the balls and bias the balls into engagement with the cam pockets of the shift sleeve.

5. A one-way synchronizer for a gear transmission comprising:
- a first drive member having a gear and a guide hub that is spaced axially from and integrally connected to the gear,
- a shift sleeve having splines engaging splines of the guide hub so that the shift sleeve slides axially on the guide hub,
- the shift sleeve having a central disengaged position on the guide hub and being slidable axially on the guide hub in opposite directions to an extended engaged position further away from the gear or to a retracted disengaged position closer to the gear,
- a plurality of circumferentially spaced struts disposed between the guide hub and the shift sleeve so that the struts slide axially with respect to the guide hub and the shift sleeve,
- detent means operatively connecting the struts to the shift sleeve when the shift sleeve is in the central disengaged position so that struts follow the shift sleeve when it slides axially with respect to the guide hub until forces applied to the struts exceed a predetermined limit.
- a second coaxial drive member having a cone clutch surface and a ring of clutch teeth that are engaged by the splines of the shift sleeve when the shift sleeve is in the extended engaged position, and
- a blocker ring disposed between the guide hub and the clutch teeth of the second drive member, the blocker ring having a cone clutch surface juxtaposed the cone clutch surface of the second drive member, cam clutch teeth that cooperate with the splines of the shift sleeve as it translates from the central disengaged position to the extended engaged position, and axial drive slots for indexing the blocker ring circumferentially with respect to the second drive member,
- the struts having drive lugs that are disposed in the drive slots for indexing the blocker ring circumferentially with respect to the second drive member and stops that engage the first drive member to limit axial translation of the struts with respect to the guide hub when the shift sleeve is retracted from the extended engaged position.

6. The one-way synchronizer as defined in claim 5 wherein the struts have tabs at one end that extend radially inwardly to provide the stops and wherein the stops engage the an end face of the first drive member so that the drive lugs cannot follow the shift sleeve when it slides from the central disengaged position to the retracted disengaged position closer to the gear.

7. The one-way synchronizer as defined in claim 6 wherein the tabs also provide the drive lugs for indexing the blocker ring circumferentially with respect to the second drive member.

8. The one-way synchronizer as defined in claim 5 wherein the detents comprise inwardly facing cam pockets of the shift sleeve, balls disposed in round holes of the struts, and springs disposed in chambers of the guide hub that engage the balls and bias the balls into engagement with the cam pockets of the shift sleeve.

9. The one-way synchronizer as defined in claim 6 wherein the detents means comprise inwardly facing cam pockets of the shift sleeve, balls disposed in round holes of the struts, and springs disposed in chambers of the guide hub that engage the balls and bias the balls into engagement with the cam pocket of the shift sleeve.

10. The one-way synchronizer as defined in claim 5 further comprising a counter shaft having a drive gear that engages the gear of the first drive member and a second one-way synchronizer for engaging the drive gear with a gear journalled on the counter shaft,
- the second one-way synchronizer having a shift sleeve that has a central disengaged position that coincides with the central disengaged position of the shift sleeve of the first synchronizer, an extended engaged position that coincides with the retracted disengaged position of the shift sleeve of the first synchronizer and a retracted disengaged position that coincides with the extended engaged position of the first synchronizer so that the one-way synchronizers can be operated simultaneously by the same mechanical operator to insure that only one synchronizer is engaged at any given time.

11. A one-way synchronizer for a gear transmission comprising:
- a first drive member having a gear and a guide hub that is spaced axially from and integrally connected to the gear,
- a shift sleeve having splines engaging splines of the guide hub so that the shift sleeve slides axially on the guide hub,
- the shift sleeve having a central disengaged position on the guide hub and being slidable axially on the guide hub in opposite directions to an extended engaged position further away from the gear or to a retracted disengaged position closer to the gear,
- a plurality of circumferentially spaced struts disposed between the guide hub and the shift sleeve so that the struts slide axially with respect to the guide hub and the shift sleeve,
- detent means comprising inwardly facing cam pockets of the shift sleeve, balls disposed in round holes of the struts, and springs disposed in chambers of the guide hub that engage the balls and bias the balls into engagement with the cam pockets of the shift sleeve when the shift sleeve is in the central disengaged position so that struts follow the shift sleeve when it slides axially with respect to the guide hub until forces applied to the struts exceeds a predetermined limit,
- a second coaxial drive member having a cone clutch surface and a ring of clutch teeth that are engaged by the splines of the shift sleeve when the shift sleeve is in the extended engaged position, and a blocker ring disposed between the guide hub and the ring of clutch teeth of the second drive member, the blocker ring having a cone clutch surface juxtaposed the cone clutch surface of the second drive member, cam clutch teeth that cooperate with the splines of the shift sleeve as it translates from the central disengaged position to the extended engaged position, and axial drive slots for indexing the blocker ring circumferentially with respect to the second drive member, the struts having tabs that extend radially inwardly and that are disposed in the axial drive slots for indexing the blocker ring circumferentially with respect to the second drive member, the tabs engaging an end face of the first drive member to limit axial translation of the struts with respect to the guide hub when the shift sleeve is retracted from the extended engaged position and so that the drive legs cannot follow the shift sleeve when it slides from the central disengaged position to the retracted disengaged position closer to the gear.

12. The one-way synchronizer as defined in claim 11 further comprising a counter shaft having a drive gear that engages the gear of the first drive member and a second one-way synchronizer for engaging the drive gear with a gear journalled on the counter shaft, the second one-way synchronizer having a shift sleeve that has a central disengaged position that coincides with the central disengaged position of the shift sleeve of the first synchronizer, an extended engaged position that coincides with the retracted disengaged position of the shift sleeve of the first synchronizer and a retracted disengaged position that coincides with the extended engaged position of the first synchronizer so that the one-way synchronizers can be operated simultaneously by the same mechanical operator to insure that one synchronizer is engaged.

* * * * *